Oct. 25, 1960

J. S. NELSON 2,957,215

PERMANENT MOLD AND METHOD FOR MAKING CAST
LINK CHAIN OF ALUMINUM OR BRONZE

Filed Aug. 8, 1957

INVENTOR.
JOHN S. NELSON

BY Taulmin & Taulmin

Attorneys

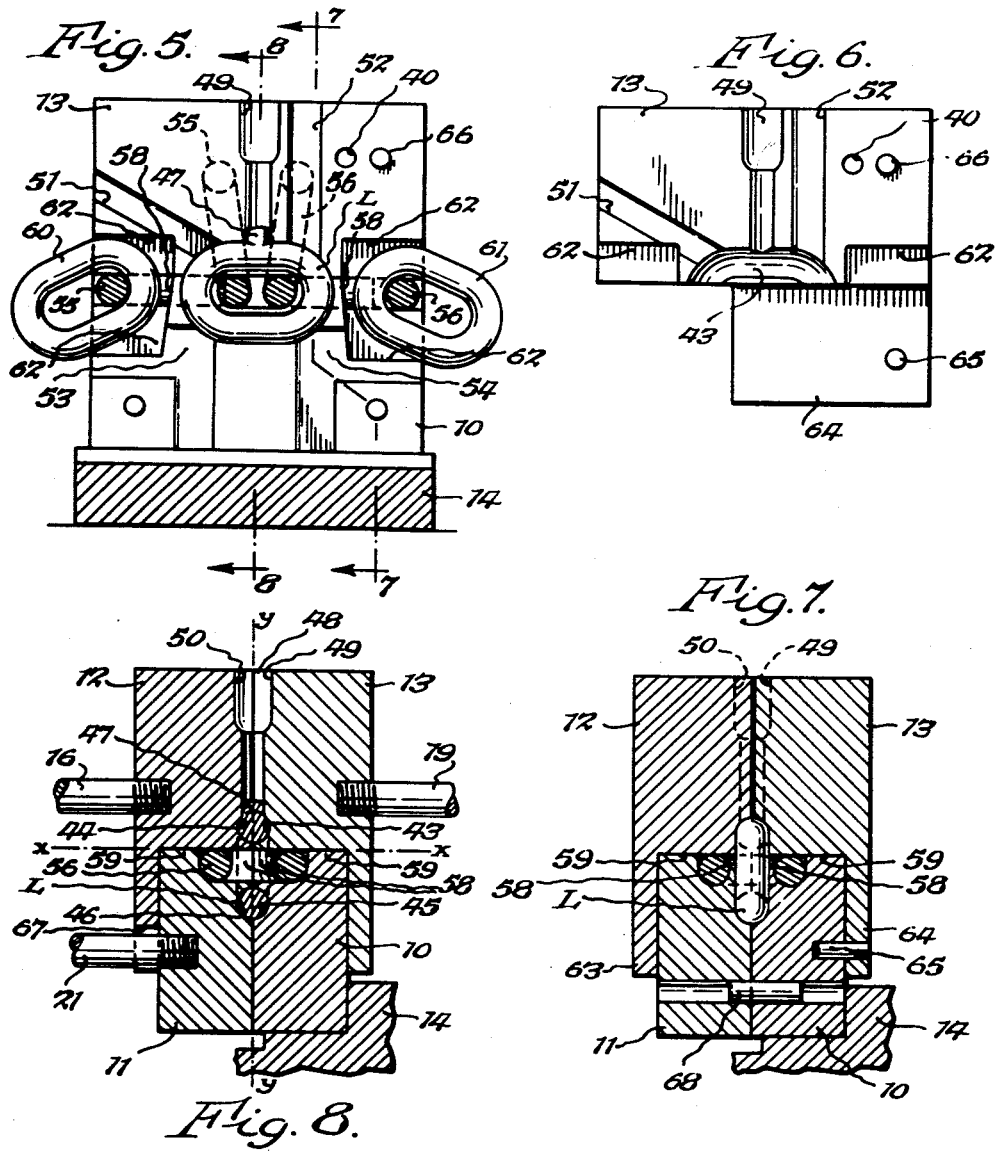

Oct. 25, 1960 J. S. NELSON 2,957,215
PERMANENT MOLD AND METHOD FOR MAKING CAST
LINK CHAIN OF ALUMINUM OR BRONZE
Filed Aug. 8, 1957 5 Sheets-Sheet 3
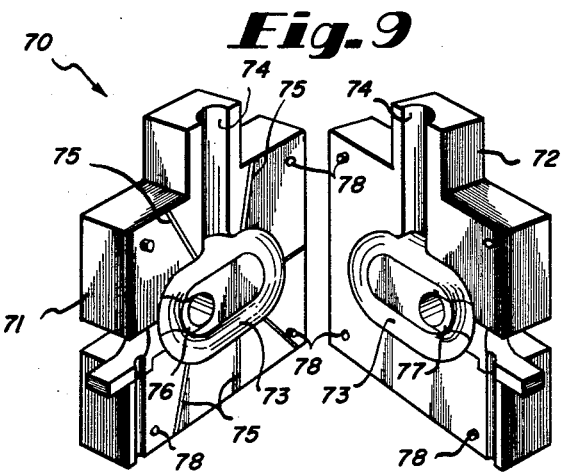
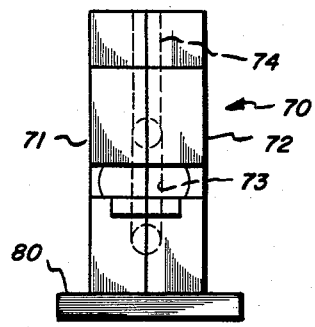
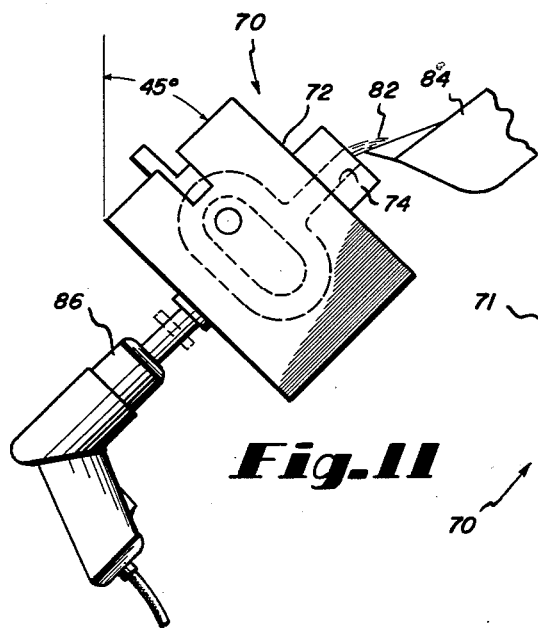
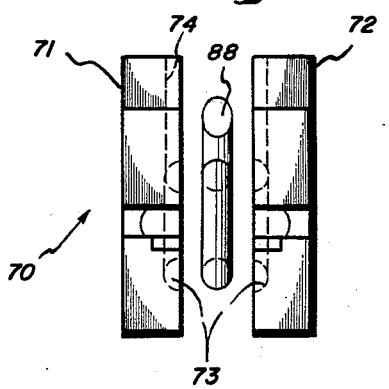
INVENTOR
JOHN S. NELSON
BY Taulmin & Taulmin
ATTORNEYS

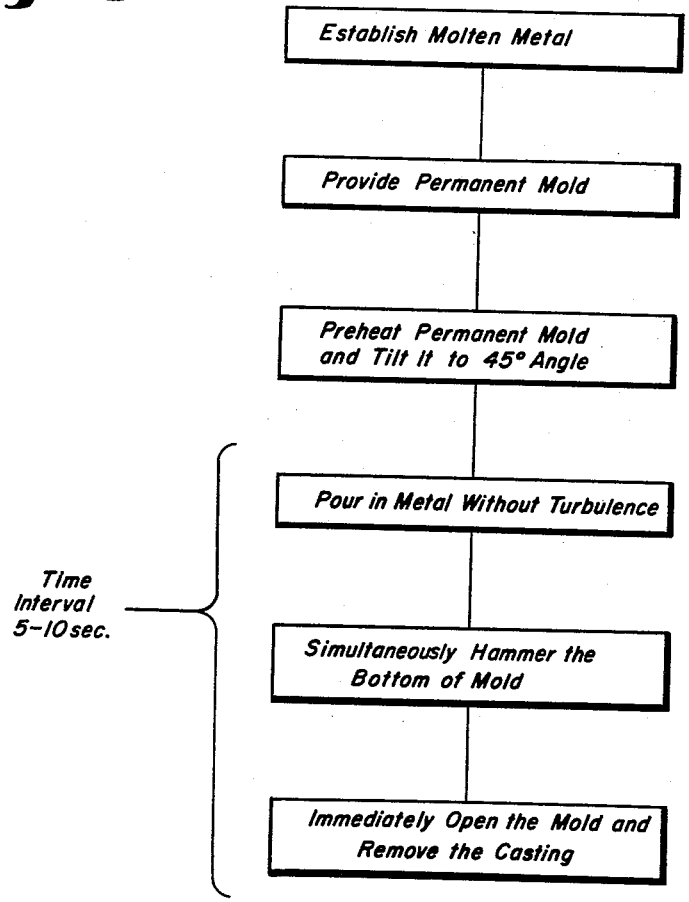

Oct. 25, 1960

J. S. NELSON 2,957,215

PERMANENT MOLD AND METHOD FOR MAKING CAST
LINK CHAIN OF ALUMINUM OR BRONZE

Filed Aug. 8, 1957

INVENTOR
JOHN S. NELSON

BY

ATTORNEYS

United States Patent Office 2,957,215
Patented Oct. 25, 1960

2,957,215
PERMANENT MOLD AND METHOD FOR MAKING CAST LINK CHAIN OF ALUMINUM OR BRONZE

John S. Nelson, 249 Hertel Ave., Buffalo, N.Y.

Filed Aug. 8, 1957, Ser. No. 677,064

4 Claims. (Cl. 22—216)

This invention relates to a permanent mold and a method for making cast link chain of aluminum or bronze.

Heretofore it has been customary to form the links for a chain from lengths of bar stock each of which is bent into a ring and then welding the opposing ends of the ring together. The use of such a method to form aluminum chain is not commercially feasible because of the difficulty and prohibitive cost of welding aluminum.

It is also known to cast links which are used in chains but this is usually done by forming the molds of sand which of course are destroyed in order to free the molded link. Such a method is also economically unfeasible and too slow for mass production.

While prior attempts have been made to employ permanent molds for casting chain links, these attempts have been singularly unsuccessful from a commercial standpoint so that cast aluminum or bronze chain is unavailable on the market today and unheard of although there is a great need therefor.

Aluminum or bronze chain is desirable for use where the conventional iron or steel chain rapidly corrodes and requires frequent maintenance. Further, because of its lighter weight aluminum or bronze chain is highly suited for ornamental purposes where the heavier iron chain is now being used. Also, by using the proper aluminum or bronze alloys link chain having the desired strength properties can be produced.

It is, therefore, the principal object of the present invention to provide a permanent mold for making a cast aluminum or bronze chain link interconnected with previously cast links.

An important object is to provide a permanent mold for making chain links of aluminum and alloys of aluminum, in which the mold pouring gate is of increased width at the juncture of the gate, with the mold cavity defining the link to provide improved castings.

Another object is to provide such a mold which can be used to produce commercial quantities of aluminum or bronze chain in a practical and economically feasible manner.

Another object is to provide a multiple part mold which can be both rapidly assembled preparatory to the casting operation and also quickly disassembled to free the link after it has been cast, the whole procedure taking only a matter of seconds.

Another object is to provide such a mold which forms a chain link which requires little dressing up after being cast to make it commercially acceptable.

Still another object of the invention is to provide an improved method of making chains using permanent molds as aforementioned.

Other objects and advantages will be apparent from the following description and accompanying drawings in which—

Figure 5 is a vertical central sectional view through the mold, this view being taken on line 5—5 of Figure 4, and showing the disposition of the various links, additional links to those shown in Figure 4 being illustrated;

Figure 6 is a view similar to Figure 5, and showing only the inner face of one of the upper mold parts with the chain removed;

Figure 7 is a vertical cross-sectional view of the mold in its fully closed position, this view being taken on line 7—7 of Figure 5;

Figure 8 is a similar cross-sectional view taken on line 8—8 of Figure 5;

Figure 9 is an exploded view in perspective illustrating a permanent mold for casting link type chain links, the complementary mold halves being shown in open position;

Figure 10 illustrates in side elevation a closed mold, such as shown in Figure 9, which is preheated prior to the pouring thereinto of molten metal;

Figure 11 is a view in elevation and illustrating the angular position of the mold of Figure 10 during pouring of the molten metal into the mold, and illustrating diagrammatically a mold hammer for hammering the mold during filling of the same with metal, the pouring ladle for delivery of molten metal being shown partly broken away;

Figure 12 is an exploded view in side elevation illustrating the opening of the mold and removal of the cast chain link, the mold halves being shown in the position after being moved rectilinearly from each other and the cast link removed from the mold cavity;

Figure 13 illustrates by a flow sheet the essential steps of casting chain links utilizing a permanent mold in accordance with this invention;

Figure 1:
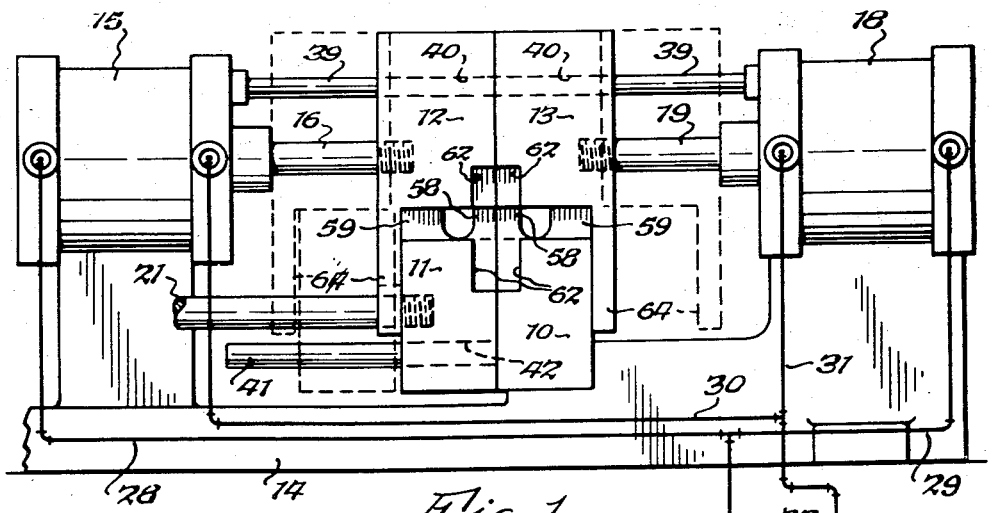
Figure 1 is an elevational view of one end of a permanent mold embodying my invention and shown as associated with apparatus, partially illustrated, for operating the mold.

The permanent mold embodying my invention is shown as having four parts 10, 11, 12 and 13. Referring to Figure 1, the parts 10 and 11 are the lower right and left sections, respectively, and the parts 12 and 13 are the upper left and right sections respectively. The mold part 10 is shown as being mounted in a stationary position and for this purpose is suitably rigidly mounted on a base 14 which may be supported in any suitable manner. The other mold parts 11, 12 and 13 are shown as arranged for movement in a horizontal direction, this for the purpose of opening and closing the mold as hereinafter described.

Figure 2:
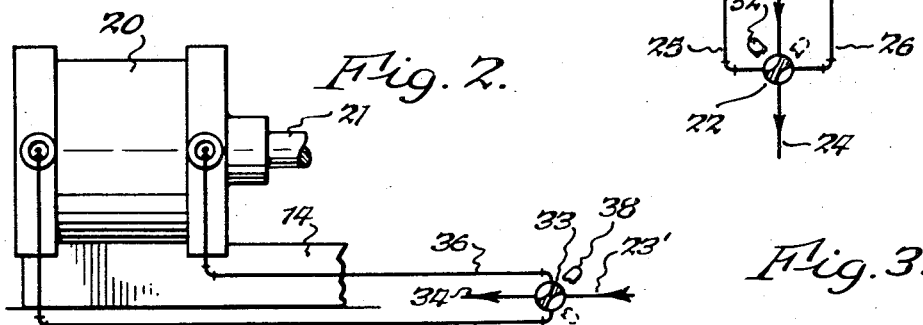
Figure 2 is a supplemental view showing additional apparatus, not illustrated in Figure 1, for operating the mold.

The means for moving the movable mold parts 11, 12 and 13 may be of any suitable type, those shown being pneumatic piston and cylinder devices which are preferred. Thus, in Figure 1, a cylinder 15 is shown as rigidly mounted on the base 14 and has its piston rod 16 connected to the upper left mold part 12; and a similar cylinder 18 is rigidly mounted on the base 14 to the right of the mold and has its piston rod 19 suitably connected to the upper right mold part 13. Referring to Figure 2, which is an extension of the left end of the frame 14, there is shown a third cylinder 20 rigidly mounted thereon and having its piston rod 21 suitably connected to the lower left mold part 11. The piston and cylinder devices are of the double acting type.

The pistons (not shown) slidably arranged in the various cylinders 15, 18 and 20 and connected to their respective piston rods 16, 19 and 21 are caused to reciprocate by air lines and valves which will now be described. The numeral 22 represents diagrammatically a four-way valve connected on diametrically opposite sides to a compressed air line 23 leading to any suitable source (not shown) of compressed air such as an air compressor, and to an exhaust line 24 communicating with the atmosphere. Also connected to diametrically opposite sides of the valve 22 are lines 25 and 26. The line 25 has two branches 28 and 29, the branch line 28 leading to the end of the cylinder 15 remote from the mold and the branch line 29 leading to the end of the cylinder 18 remote from the mold. The line 26 also has two branches 30 and 31, the branch line 30 leading to that end of the cylinder 15 which is adjacent the mold and the other branch line 31 leads to that end of the cylinder which is adjacent the mold. The valve 22 is operated by a control lever 32.

With this control lever 32 in the full line position shown and with the valve as illustrated, it will be seen that compressed air is admitted from line 23, through the upper left passage of the valve into line 25, from whence the compressed air passes through branch lines 28 and 29 into their respective cylinders 15 and 18 at the ends thereof remote from the mold so as to urge the pistons toward each other and thereby bring the upper mold parts 12 and 13 together and so maintain them. The opposite ends of these cylinders 15 and 18 are connected to the atmosphere through the branch lines 30 and 31, line 26, lower right passage of the valve 22 and exhaust line 24. When the control lever 32 is swung to the right to the dotted line position, the valve 22 is rotated so as to establish communication between the lines 23 and 26 on the one hand and the lines 24 and 25 on the other hand. This operates to reverse the pressures on the pistons in the various cylinders and cause the upper mold parts 12 and 13 to separate or open.

Turning now to a consideration of the operation of the cylinder 20 which controls the movement of the lower left mold part 11, the numeral 33 represents a valve similar to the valve 22. Line 23' is the compressed air line and may be considered a branch of line 23. Line 34 is an exhaust line to the atmosphere and is diametrically opposite to line 23'. The other pair of lines connected to diametrically opposite sides of the valve 33 are the lines 35 and 36. The line 35 leads to that end of the cylinder 20 which is remote from the mold and the line 36 leads to the opposite end of this cylinder. The valve 33 is shown as movable by a control lever 38. With this lever 38 in the full line position shown, compressed air is admitted from line 23, through the lower right passage of the valve 33, thence through the line 35 to the remote end of the cylinder 20. This urges the piston and rod 21 to move to the right to close the lower left movable mold part 11 against the stationary mold part 10 and to maintain it so closed. When the control lever is swung downwardly to the lower position represented by the dotted lines, the valve 33 is rotated to establish communication between the compressed air line 23' and the line 36 on the one hand, and the exhaust line 34 and the line 35 on the other hand, and thereby reverse the pressures on the piston in the cylinder 20 so as to retract the piston rod 21 and separate the lower mold parts 11 and 10.

During opening and closing of the mold, the movable mold parts are guided so as to assure proper registry of the various parts when the mold is closed. To this end, each of the cylinders 15 and 18 carries a guide rod 39 which slides in a hole 40 provided in the upper mold parts 12 and 13. As shown, the corresponding guide rods 39 and holes 40 are in alignment with one another. Movement of the lower movable mold part 11 is guided on a rod 41 fast to the stationary mold part 10 and projecting through a hole 42 in the movable mold part 11.

The mold parts 10, 11, 12 and 13 are shown as being in the form of metal blocks having their opposing vertical faces suitably recessed to provide jointly a mold cavity for the link to be cast therein. Such a link is shown at L in Figures 4, 5, 7 and 8. All of the mold parts meet along a common vertical plane represented by the line y—y in Figure 8 and along a common horizontal plane represented by the line x—x in Figure 8. It will be noted that the plane y—y or vertical parting line of the mold parts passes through the center of the link L whereas the plane x—x or horizontal parting line of the mold parts is arranged above the midpoint of the spacing between the horizontal and parallel side stretches of the link L.

The inner vertical face of the upper mold part 13 is shown in Figure 6 in which the groove 43 has its ends turned downwardly to open to the lower face of the mold block 13. This groove 43 is semi-circular in cross section. A similar groove 44 is formed in the inner vertical faces of the other upper mold part 12 (see Figure 8) and these two grooves 43 and 44 jointly form a channel circular in cross section for the upper section of the link L. Referring to Figures 5, 6 and 7, the opposing vertical faces of the lower mold blocks 10 and 11 are formed respectively with grooves 45 and 46 semi-circular in cross section, each turned up at its ends to form continuations of the grooves 43 and 44 respectively.

Figure 3:
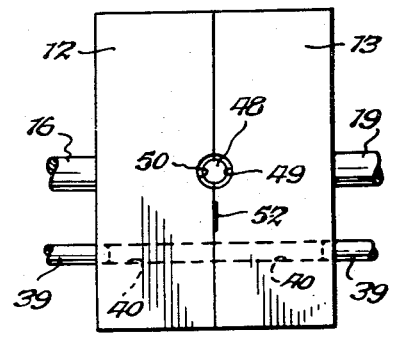
Figure 3 is a top plan view of the mold shown in Figure 1 with certain of the associated parts being illustrated fragmentarily.

When the mold is closed as shown in Figures 3 and 8, molten metal is poured into the mold cavity through a gate 48 formed by semi-circular grooves 49 and 50 provided respectively in the opposing vertical faces of the upper mold blocks 13 and 12. The grooves 49 and 50 forming the gate 48 lead to the mold cavity and, of course, will leave a sprue 47 on the link L which can be later removed as by grinding off the same.

An important feature of my invention comprises the provision of a tapered gate structure which has its greatest width or cross section dimension located at the juncture of the gate with the cavity of the mold, as illustrated in Figures 14 through 21.

Such a widened mold gate structure is just the reverse of what has been conventional practice. It has been my discovery, however, that when casting links and the like of aluminum or aluminum alloy bronzes and the like, especially aluminum chain links using a permanent mold as described, that it is important and essential to provide a wide gate opening at the mold cavity junction. Due to the high shrinkage factor in aluminum and light metal castings it has been observed that where the gate opening leading to the mold cavity is made to taper from the top to the entrance to the mold cavity and having a wider gate dimension at the mold cavity entrance avoids the tendency to develop cracks at the foot of the sprue and at the junction of the casting. Such a defective casting, of course, has to be scraped which increases the cost of the casting operation.

The difficulties encountered heretofore have been overcome, for all practical purposes, by employing a mold gate tapered from top of the mold to the mold cavity, as illustrated. This mold gate construction along with multiple vents makes it possible to use permanent molds for casting alumimun chain links and the like which are sound. Furthermore, the molds can be used over and over again without deterioration of the mold. A preferred gate dimension found to be necessary to use to produce sound castings of aluminum and these high shrinkage metals is to widen the gate dimension at the junction of the same with the mold cavity to approximately twice the diameter of the link or casting mold cavity cross section area at said junction and at the foot of the sprue.

Another important feature of the invention is the means which I provide for venting the mold cavity when the molten metal is poured into the cavity. Heretofore it has been general practice to provide circular vent holes but to provide adequate cross sectional area for the passage of air being displaced, in order to prevent defective castings, the circular vent holes were so large that metal would flow into them leaving risers or projections on the cast article which sometimes rendered it difficult to open the mold and always required additional time for removing the risers or projections. I have avoided all of these difficulties by providing very shallow but broad vents. Referring to Figure 5, two such vents, 51 and 52 are shown, as provided by grooves formed in the inner vertical face of the upper mold part 13, and also two similar grooves 53 and 54 in the inner vertical face of the lower mold part 10. The grooves 51, 52, 53 and 54 are only several thousandths of an inch deep and it has been found that the molten metal will not flow into these grooves. While I have shown these grooves as provided only in the inner vertical faces of the mold parts 10 and 13, it will be understood that they can be provided instead in the inner vertical faces of the other mold parts 11 and 12, or registered grooves can be provided in both faces as long as the thickness of the vent hole formed jointly by them is not more than a few thousandths of an inch. Also, of course, the direction of the grooves and their number can be varied from that shown in the drawings as long as provision is made for a liberal venting of the mold cavity. With such a venting arrangement I have found that good sound links can be cast with a very low percentage of rejects because of blow holes and the like.

Figure 4:
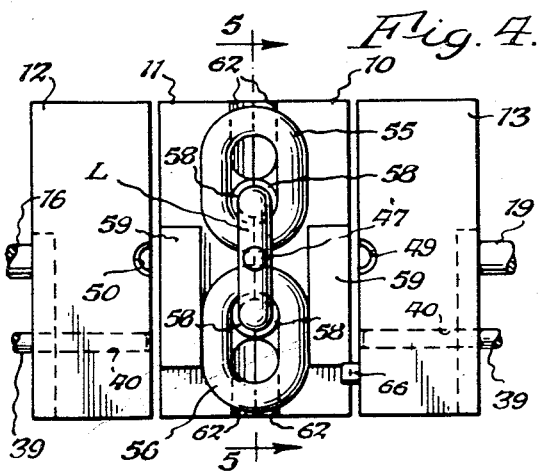
Figure 4 is a top plan view similar to Figure 3, with the upper parts of the mold separated and showing the manner in which the central link cast in the mold is disposed with respect to adjacent chain links on either side.

It is a further important feature of my invention to make provision for casting the link L to connect two links which have already been formed. This is illustrated in Figures 4 and 5 where the links 55 and 56 are to be connected by the link L. These links 55 and 56 have previously been formed singly as in a simple two part mold which forms no part of the present invention and hence is not illustrated. Accommodation for the links 55 and 56 in a horizontal plane is provided by recessing the upper faces of the lower mold parts 10 and 11.

Referring to Figure 4, the upper surfaces of the mold parts 10 and 11 are recessed the thickness of the links 55 and 56 everywhere except for leaving a pair of raised tubular necks 58—58 which surround the curved portions of the link L at opposite ends thereof and a pair of raised abutments 59—59 which engage the lower surfaces of the upper mold blocks 12 and 13, as shown in Figures 7 and 8.

Since additional links 60 and 61 may be connected to the links 55 and 56 respectively when the link L is cast, recesses 62 are provided at the adjacent corners of the various mold parts 10, 11, 12 and 13 to provide jointly recesses to accommodate the links 60 and 61 when the mold is fully closed.

To interconnect the mold parts 10, 11, 12 and 13 when the mold is fully closed, the upper mold parts 12 and 13 are shown as having depending skirt portions 63 and 64 respectively which extend along and lie against the lateral outer faces of the lower mold blocks 11 and 10 respectively. The skirt portion 63 is cut out at 67 (Figure 8) to avoid interference with the piston rod 21. As shown in Figure 6, the skirt portion 64 for the upper mold part 13 has at least one dowel pin 65 which is received in a registered hole in the lower mold block 10. Although not shown, the skirt 63 for the other upper mold part 12 has a similar dowel pin and recess connection with the lower mold block 11. These dowel pins 65 prevent vertical separation of the mold blocks along the horizontal parting line x—x shown. The upper pair of mold blocks 12 and 13 are prevented from vertical displacement relative to each other along the line y—y by one or more dowel pins 66 on one of these blocks received in registered recesses in the other of these blocks. Similarly the lower mold blocks 10 and 11 are prevented from displacement by dowel pins 68—68 on one of these blocks and received in registered recesses in the other of these blocks.

Assuming the apparatus to be in the condition shown in Figure 1 in which the mold is shown fully closed with no chain links arranged in any of its recesses, the control lever 32 for the valve 22 is turned to the dotted line position which will open the upper half of the mold by separating the upper mold blocks 12 and 13 to the position of these blocks shown in Figure 4. The already formed links 55 and 56 will then be placed flat or horizontally on the exposed upper surfaces of the lower mold parts 10 and 11 with the curved inner ends of these links embracing the upstanding necks 58—58. If additional links such as the links 60 and 61 shown in Figure 5 are on the links 55 and 56 respectively, the links 60 and 61 are set on end or vertically in the recesses 62 in the lower mold blocks 10 and 11.

The upper mold parts are then brought together again by returning the control lever 32 to its original full line position. This closes the mold fully and molten aluminum or bronze may thereupon be poured into the mold cavity through the gate 48 to form the link L with the sprue 47 thereon. As previously explained, molten metal will not flow into the shallow broad vents. After the metal cools sufficiently, which is practically simultaneous with the pouring operation, the control lever 32 is again swung to the right to cause the upper mold parts to separate to the position shown in Figure 4. The links 55 and 56 are then turned upwardly about their inner ends to the dotted line position shown in Figure 5. This unlocks the split halves of the necks 58 which were projecting into the eyes or openings in the links 55 and 56 and permits the lower mold parts 10 and 11 to be separated which is thereupon accomplished by turning the control lever 38 for the valve 33 downwardly to its dotted line position. With the mold now fully open the cast link L is free to be removed from the lower part of the mold cavity. The control lever 38 is then returned to its full line position which operates to close the lower mold parts 10 and 11 so that the mold again assumes the condition shown in Figure 4, preparatory to receiving additional preformed links corresponding to the lines 55, 56, 60 and 61.

Figures 9 through 12 illustrate diagrammatically how the casting of chain links is carried out using a permanent mold and such as utilized for making chain links. A permanent mold, as employed for casting links as shown, is more particularly described in my copending application Ser. No. 366,446, filed July 7, 1953, now Patent No. 2,786,248, granted March 26, 1957.

The essential steps of my process is further illustrated by the flow sheet in Figure 13, and comprises—

(1) Establishing a source of molten metal from which the chain link castings are to be made;

(2) Providing a permanent mold having complementary mold cavities for forming the cast chain links, and which mold can be quickly opened for removal of the casting;

(3) Providing a mold gate which is wider at the bottom than at the top to prevent shrinkage and cracking at the gate mold cavity juncture;

(4) The permanent mold is arranged with its pouring gate upward and the mold tilted at an angle of approximately 45° to the vertical, and preheated to a temperature of about ¾ that of the temperature of the molten metal to be poured thereinto;

(5) Molten metal is then poured into the mold while thus tilted to avoid turbulence, and the bottom of the mold is hammered to assist in removal of occluded air and gases from the mold cavities and cause discharge of same through the mold cavity vents;

(6) Immediately thereafter and within 3 to 5 seconds after pouring of the metal into the mold, the mold is opened and the cast chain link removed to prevent warping and sticking of the casting in the mold.

In casting chain links using permanent molds in accordance with this invention, it is important to carry out the pouring, solidifying and removal of the casting in the shortest time possible to produce sound castings and permit the continued use of the mold. If the castings are made in a mold which cannot be quickly opened within a few seconds after pouring and hammering of the mold, it has been found that the casting tends to stick and the mold cannot be opened without causing damage to the same.

In the casting of chain links as shown in Figures 9 through 12, the complementary mold 70, as illustrated in Figure 9, comprises the complementary mold halves 71 and 72 which define a link chain mold cavity 73. A pouring gate 74 is provided for communicating with the chain link cavity as shown in Figure 9. Multiple vents 75 are provided around the mold cavity on the mold part 71 to provide for effective venting of air and occluded gases during casting. This use of multiple vents is very essential in order to produce sound chain link castings. Mold parts 71 and 72 are also provided with complementary mold inserts 76 and 77 and can be closed and opened by movement of the mold parts 71 and 72 apart rectilinearly, the respective mold parts being accurately positioned together by the dowel pins 78.

After closing of the mold preparatory to making the casting, the mold is heated as indicated, by the resistance heater 80, and the heated mold then tilted to an angle of 45° to the vertical as illustrated in Figure 11.

Molten metal 82 is then introduced into the gate 74 from a ladle 84 while simultaneously with the pouring the bottom of the mold is subjected to hammer blows to assist in the removal of all gases and thoroughly vent the same from all the mold cavities. This hammering of the mold may be provided for by conventional means such as an air hammer 86, as shown in Figure 11.

Within a few seconds after pouring of the metal in the mold and its solidification, the mold is opened as by holding mold part 71 stationary or fixed and drawing away mold part 72 in a straight line path as indicated by the arrow in Figure 12. The cast link 88 is then ejected from the mold cavity and the sprue portion removed to provide a finished chain link.

Figures 14 through 21 illustrate the mold pouring gate structure which forms an important feature of the permanent molds for casting chain links and the like of aluminum and high shrinkage alloys thereof.

Figure 14:
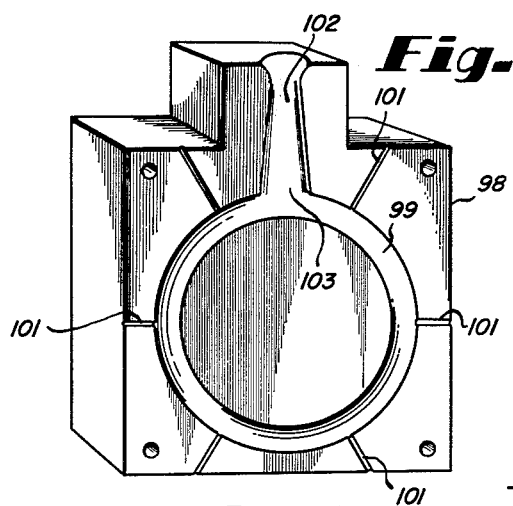
Figure 14 is a view in perspective illustrating a half-mold section for casting a ring, and showing the tapered gate construction of a permanent mold.
Figures 15, 16:
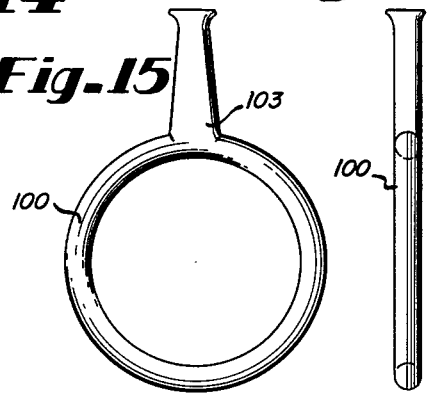
Figure 15 illustrates a cast ring of aluminum as made using a mold as shown in Figure 14.
Figure 16 is a side elevational view of the casting shown in Figure 15.

In Figure 14 a mold halve 98 is illustrated, having mold cavity 99 for casting a ring 100. Shallow vents 101 are provided circumferentially of the mold cavity. A pouring gate 102 is tapered from the top to the bottom, being enlarged at the bottom or juncture area formed with the mold cavity, as indicated at 103. This widening of the gate at the juncture increases the resistance of the casting to shrinkage cracking and functions together with the multiple vents to provide a permanent mold of the character described and which makes possible the utilization commercially of a permanent mold for making aluminum castings.

Figure 17:
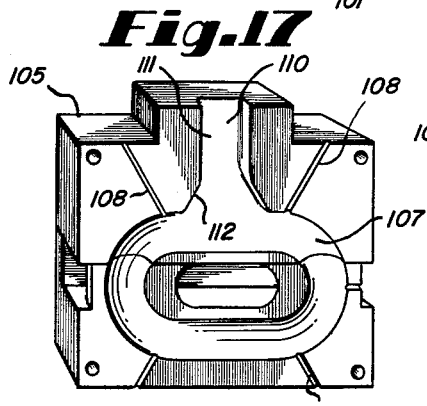
Figure 17 illustrates in perspective a half mold structure having a widened gate for casting heavy chain links of aluminum.
Figure 18:
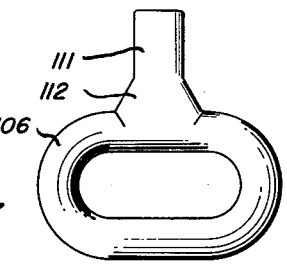
Figure 18 illustrates a cast link as removed from a mold such as shown in Figure 17.
Figure 19:
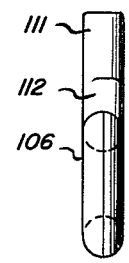
Figure 19 is a side elevational view of the casting of Figure 18.

Figure 17 illustrates a half-mold 105 of the permanent type, similarly as in Figure 14, for casting large chain links 106 such as illustrated in Figure 18. A mold cavity 107 for forming the chain link 106 is provided together with vents 108. In this instance a pouring gate 110 is dimensioned to comprise a straight section 111 extending from the top of the mold which connects with a lower and wider frusto-conical section 112.

Figure 20:
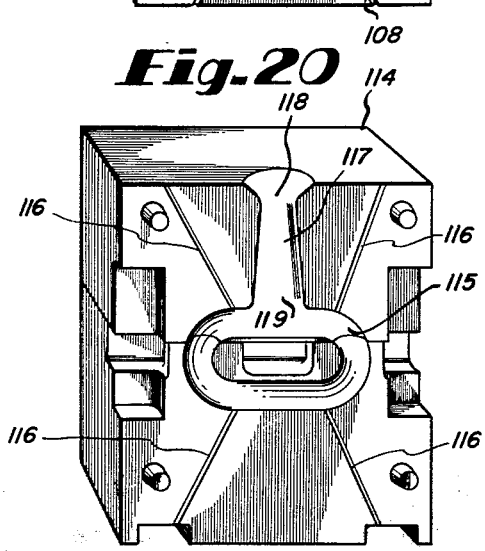
Figure 20 illustrates in perspective a half-mold structure for casting standard size chain links of aluminum, and showing the wide taper construction of the gate.
Figure 21:
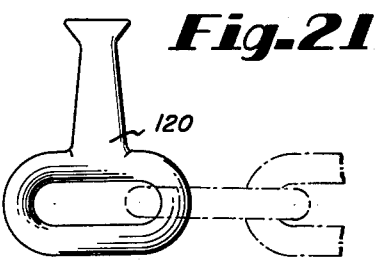
Figure 21 illustrates in elevation a chain link as cast of aluminum and using a tapered gate permanent mold structure as shown in Figure 20, the connecting chain links being shown in dotted lines.

In Figure 20 a permanent mold halve 114 having a mold cavity 115 for casting standard size chain links of aluminum is illustrated. The mold cavity is provided with vents 116 and a pouring mold gate 117 which is tapered from an upper neck section 118 to a widened lower section 119 so as to provide an enlarged cross sectional area of metal at the juncture of the pouring gate with the mold link cavity as shown at 120 on the casting in Figure 21. The enlarged portion at the juncture 120, as aforementioned, comprises an area having a diameter approximately twice that of a chain link cross section. This assures the making of aluminum castings repeatedly using a permanent mold, as described, for the production of improved castings.

An important criterion of the method of casting chain links consists in carrying out the pouring and solidification of the casting in a very short period of time. This time interval, as illustrated in Figure 13, takes approximately 5–10 seconds to complete. Where the time is substantially increased, there is difficulty in removing the casting from the mold and the production of a sound casting.

Hammering of the mold while it is tilted and receives the molten metal is important to carry out simultaneously as the molten metal is poured into the mold. Otherwise there may be gaseous occlusions in the casting which would produce an unsatisfactory cast chain link. Further, it is necessary to preheat the mold to approximately ¾ of the temperature of the molten metal to be received in order to lengthen the life of the permanent mold and prevent it from warping or distorting during successive casting operations.

In the casting of stud chain links using permanent molds in accordance with my invention, tilting of the mold may be dispensed with inasmuch as, due to the divided mold cavity construction, spattering and turbulence of the molten metal during filling of the mold is generally not encountered.

It is, however, preferred to tilt the mold along the longitudinal axis of the chain link mold cavity in order to allow the molten metal to "roll" into the mold from the ladle or pouring spout and thus avoid spattering and the setting up of a turbulent flow of molten metal which tends to entrap and hold gases. Furthermore, by pounding or striking the bottom of the mold during the pouring of the metal into the mold, air or other gases in the mold cavity which may tend to be trapped and held by the molten metal is caused to be discharged through the mold vents upon entry of the metal.

In casting the chain links the same may be made of various metals and particularly of the light metals such as aluminum, magnesium and alloys thereof. Such alloy aluminum-bronzes may contain from 10–15% aluminum and the remainder of copper. Other metals may consist of substantially all aluminum or magnesium with added alloy elements such as nickel, copper, berylium and the like, the latter alloying elements may be present in about 5–10% and the remainder aluminum or magnesium. Also chain links made of lead may be cast. Also babbit type castings may be made using alloys of copper and tin.

In accordance with this invention, castings may be made of aluminum or bronze or other metals in the production of chains and wherein permanent molds are used throughout the procedure. The casting of such chain links in permanent molds, and particularly where the casting is made in a very short time and wherein the permanent mold can be opened quickly following the reception of metal, provides an improved process of casting such products.

In this manner cast metal chain links can be produced in relatively large quantities and with sufficient speed and facility so that the manufacture of such chains commercially is now made practical. While the prior art indicates that castings can be made of chains it has not been possible heretofore to cast chain links in permanent molds and wherein the same is carried out efficiently and rapidly to produce castings which are sound and require substantially little machining to produce a finished chain.

This application is a continuation-in-part of my prior application Ser. No. 613,412, filed October 2, 1956, now Patent No. 2,871,535, granted February 3, 1959.

What is claimed is:

1. In a process of casting chain lengths of aluminum metal comprising establishing a source of molten aluminum metal, providing a permanent mold having a pouring gate and communicating mold cavities for defining a chain link into which molten aluminum metal is introduced to form cast chain links, the improvement in carrying out the casting operation to insure sound castings which consists in tilting the mold so that the pouring gate is at an angle of approximately 45° to the vertical, pre-heating the mold prior to introducing molten metal thereinto to a temperature of about three-quarters the temperature of the molten aluminum metal to be poured thereinto, pouring the molten aluminum metal into the mold while the mold is thus heated and tilted, applying hammering blows against the bottom of the mold during and immediately after the pouring of the metal into the mold, and thereafter opening the mold within a period of from 3 to 5 seconds after pouring of the metal thereinto and removing the casting.

2. In the process of casting link chains of aluminum or bronze which consists in establishing a source of molten aluminum metal and introducing the same into a permanent mold comprising separable engaging metal blocks having complementary mold cavities therein defining a chain link and a tapered pouring gate communicating therewith which comprises an enlarged section at the junction of the gate with the mold cavity, the improvement which consists in pouring molten aluminum metal into the gate and into the mold cavity while the mold is tilted to an angle of approximately 45° to the vertical to avoid turbulence, and simultaneously hammering the mold thereafter immediately upon solidification of the molten metal therein, opening the mold within 3 to 5 seconds, and removing the casting.

3. In the process of casting link chains of aluminum or bronze which consists in establishing a source of molten aluminum metal and introducing the same into a permanent mold comprising separable engaging metal blocks having complementary mold cavities therein defining a chain link and a tapered pouring gate communicating therewith which comprises an enlarged section at the junction of the gate with the mold cavity, the improvement which consists in arranging the mold with the pouring gate upward and tilting the mold from the vertical, preheating the mold to a temperature approximately ¾ the temperature of the molten aluminum metal to be poured into the mold, pouring the molten metal in the mold while thus tilted to an angle of approximately 45° to the vertical and concurrently vibrating the mold to remove occluded gases, and opening the mold within 3 to 5 seconds and upon solidification of the molten metal and removing the casting.

4. In the process of casting link chains of aluminum or bronze which consists in establishing a source of molten aluminum metal and introducing the same into a permanent mold comprising separable engaging metal blocks having complementary mold cavities therein defining a chain link and a tapered pouring gate communicating therewith which comprises an enlarged section at the junction of the gate with the mold cavity, the improvement which consists in tilting said mold so that the pouring gate is at an angle of approximately 45° to the vertical, preheating the mold to a temperature of about ¾ the temperature of the molten aluminum metal to be poured thereinto, pouring the molten metal into the mold while the mold is tilted to thereby avoid turbulence and while simultaneously hammering the mold immediately after the pouring of the metal into the mold, opening the mold within from 3 to 5 seconds after pouring of the metal thereinto, and removing the casting.

References Cited in the file of this patent

UNITED STATES PATENTS

| Number | Name | Date |
|---|---|---|
| 581,640 | Wilson | Apr. 27, 1897 |
| 1,262,613 | Mumford | Apr. 9, 1918 |
| 1,639,456 | Johnson | Aug. 16, 1927 |
| 1,777,673 | Kittredge | Oct. 7, 1930 |
| 1,913,107 | De Bruyne | June 6, 1933 |
| 1,956,910 | Roth | May 1, 1934 |
| 2,116,630 | Jones | May 10, 1938 |
| 2,239,381 | Colwell | Apr. 22, 1941 |
| 2,748,433 | Preston et al. | June 5, 1956 |
| 2,764,790 | Nelson | Oct. 2, 1956 |

FOREIGN PATENTS

| Number | Country | Date |
|---|---|---|
| 17,010 | Great Britain | Dec. 29, 1884 |

OTHER REFERENCES

"The Metallurgy of Aluminum and Aluminum Alloys," publication by Anderson, page 621 relied on.